United States Patent [19]
Berman

[11] 3,753,059

[45] Aug. 14, 1973

[54] SIMPLIFIED BATTERY POWERED REGENERATIVE DRIVE SYSTEM

[75] Inventor: Baruch Berman, Palos Verdes Peninsula, Calif.

[73] Assignee: TRW Inc., Redondo Beach, Calif.

[22] Filed: Apr. 3, 1972

[21] Appl. No.: 240,389

[52] U.S. Cl............ 318/139, 318/341, 318/369, 318/376
[51] Int. Cl............................................. H02p 7/28
[58] Field of Search................ 318/139, 341, 369, 318/376; 290/9, 19; 180/65 R

[56] References Cited
UNITED STATES PATENTS

| | | | |
|---|---|---|---|
| 3,297,930 | 1/1967 | Payne | 318/139 UX |
| 3,546,548 | 12/1970 | Wouk | 318/139 |
| 3,566,717 | 3/1971 | Berman | 290/14 X |

Primary Examiner—J. D. Miller
Assistant Examiner—H. Huberfeld
Attorney—Daniel T. Anderson et al.

[57] ABSTRACT

A battery powered regenerative drive system having a time ratio controlled regenerative chopper circuit for regulating electrical power flow between the drive system battery and traction motor in both the drive and regenerative modes of the drive system, and a novel and simplified mode switching arrangement utilizing only two switches, which may be either unidirectional solid state switches or contacts of a single pole double throw relay, for switching the drive system between its drive and regenerative modes.

6 Claims, 2 Drawing Figures

3,753,059

SIMPLIFIED BATTERY POWERED REGENERATIVE DRIVE SYSTEM

Reference is made herein to copending application filed Mar. 30, 1972, Ser. No. 239,568, and entitled "An Energy Storage and Transfer Power Processor with Self-Contained Parametric Regulating Loop".

BACKGROUND OF THE INVENTION

1. Field of the Invention

This invention relates generally to battery powered, including hybrid battery powered, electrical drive systems of the kind which utilize a time ratio controlled chopper circuit to regulate electrical power flow through the systems. The invention relates more particularly to such a drive system which is operable in both a drive mode and a regenerative mode and embodies a novel mode switching arrangement for switching between these operating modes.

2. Prior Art

The critical need to reduce air pollution has sparked renewed interest in electrical and hybrid electrical drive systems for automobiles and other vehicular applications. Classically, these drive systems were intially implemented with electromechanical contactors and lossy rehostates. Such drives are characterized by various disadvantages which are well known to those versed in the art and need not be discussed here. Suffice it to say that some of these disadvantages are gradually being overcome in industrial vehicles applications by replacement of the rheostats by thyristorized controls. Most of these thyristorized controls, however, do not have bi-directional characteristics and are hence not capable of operation in a regenerative mode as is hightly desirable if not absolutely essential in passenger vehicle applications.

U.S. Pat. No. 3,566,717 discloses a hybrid battery powered drive system which is capable of regeneration, that is capable of operation in both a drive mode and a regenerative mode. In the drive mode, the traction motor of the drive system is powered from the battery to propel the vehicle. In the regenerative mode, the motor is driven as a generator from the road to both deliver charging current to the battery and produce an electromagnetic braking torque on the vehicle.

The patented drive system embodies a solid state time ratio controlled regenerative chopper circuit through which electrical power flows from the battery to the motor in the drive mode and from the motor (generator) to the battery in the regenerative mode. In each mode, power flow is controlled by regulating the duty cycle, i.e. by proportioning the conduction time to the blocking time of the chopper circuit, to regulate driving torque in the drive mode and braking torque and battery charging current in the regenerative mode. The duty cycle is thus regulated by manipulation of a throttle pedal having an intermediate mode transfer position. Depression of the pedal through this mode transfer position shifts the drive system from the regenerative mode to its drive mode. Release of the pedal for reverse movement or retraction through the mode transfer position shifts the drive system from its drive mode to its regenerative mode.

In the drive system of the patent, mode shifting in response to movement of the throttle pedal through its mode transfer position is accomplished by a number of electromechanical relays. Such a multirelay mode switching arrangement has certain disadvantages.

Among the foremost of these is relatively low transfer speed between drive and regenerative modes, relatively large weight and volume of the relays, relatively high cost, and relatively short service life.

The earlier mentioned copending application also discloses a battery powered regenerative drive system capable of operation in drive and regenerative modes.

SUMMARY OF THE INVENTION

The present invention provides a battery powered regenerative drive system which utilizes a solid state time ratio controlled regenerative chopper circuit to control electrical power flow between the battery and traction motor in both the drive and regenerative modes of the drive system and embodies a novel simplified mode switching arrangement for switching the drive system between these modes. This switching arrangement uses only two active mode transfer switches, one in series and one in parallel with the traction motor armature, in combination with a few additional passive unidirectional solid state devices to accomplish the mode switching function. The mode switching function is carried out in such a way that the mode transfer switches operate between their conducting and blocking states only in the dry switching mode, that is at zero or very low current levels. Accordingly, the switches need not be rated for power handling, that is for power and current interruption, but rather only for voltage blocking and current conduction. In this regard, the mode transfer switches will be recognized by those versed in the power handling art as true switches, in contrast to breakers and switchers which are power handling devices, and possess the usual advantages of smaller size, lesser weight, lower cost, etc., compared to power handling devices.

Two embodiments of the invention are disclosed. One embodiment is a single relay system wherein the mode transfer switches are the contacts of a single pole double throw relay. The other embodiment is an all solid state system wherein the mode transfer switches are solid state devices, namely SCRs. A unique feature of the latter embodiment resides in the fact that the chopper circuit of the drive system embodies a power SCR switch controlled by a commutating network to accomplish the power "chopping" or pulsing function of the chopper, and this commutating network also performs the turn-off function necessary to effect switching of the mode transfer SCR switches between their conducting and blocking states.

DESCRIPTION OF THE PREFERRED EMBODIMENTS

Figure 1:
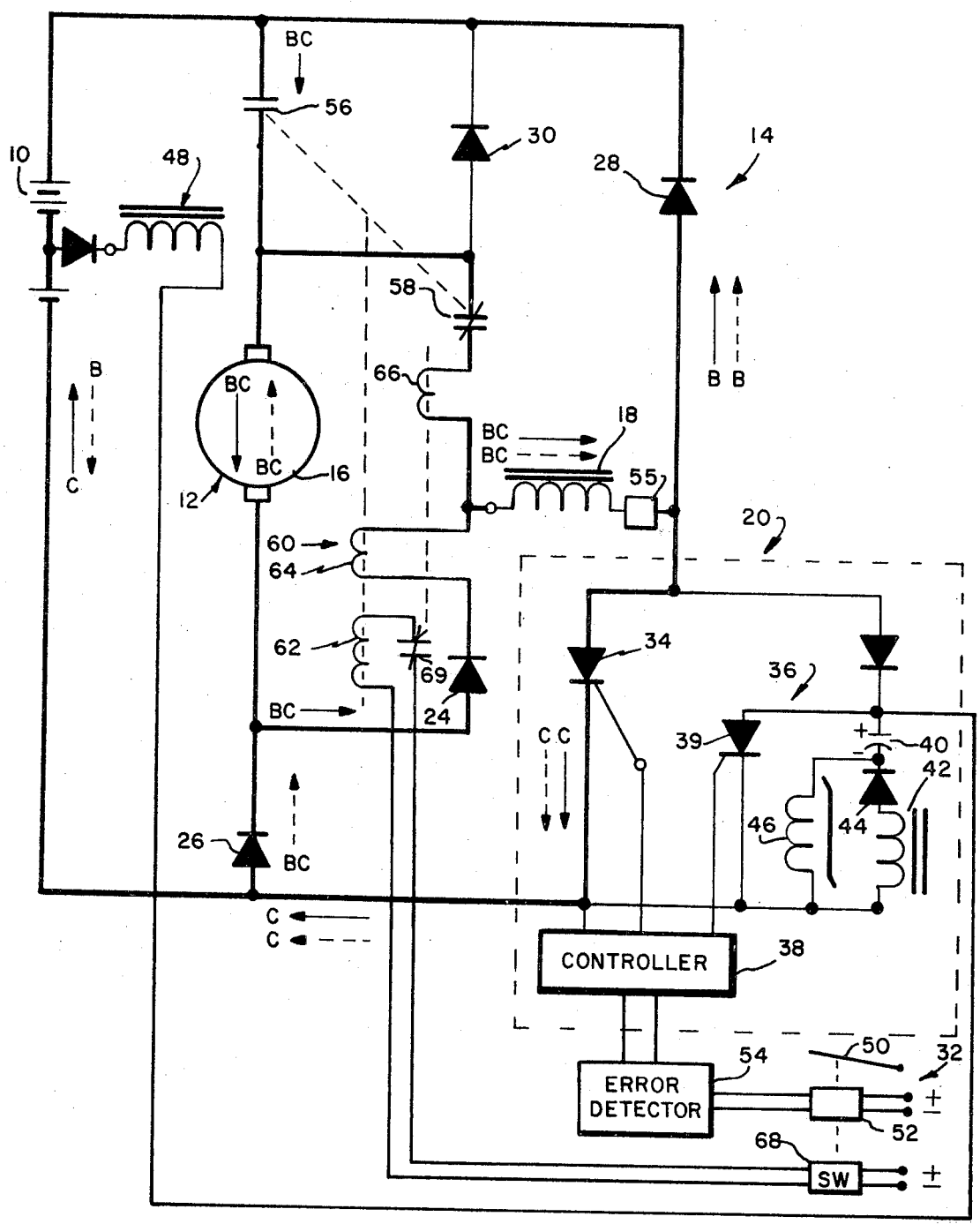
FIG. 1 schematically illustrates a single relay battery powered regenerative drive system according to the invention.

The battery powered regenerative drive system of FIG. 1 has a battery 10 and a traction motor 12 connected by an electrical power control unit 14 for transmitting electrical energy between the battery and motor. As will be explained in more detail shortly, the drive system is operable in a drive mode and a regenerative mode. In the drive mode, the motor 12 is powered from the battery 10 to drive the motor armature. In the regenerative mode, the motor is driven as a generator, such as during downhill coasting of a vehicle propelled by the drive system, to charge the battery and produce an electromagnetic braking torque on the motor armature.

Motor 12 is a d.c. motor such as a series type d.c. motor rated for high speed operation and has an armature 16 and field 18. Since this motor produces driving torque in the drive mode and braking torque in the regenerative mode, it is hereafter referred to as a torquer.

Power control unit 14 includes a time ratio controlled regenerative chopper circuit 20, mode switching means 22, diodes 24, 26, 28, 30, and a manual control 32. Chopper circuit 20 has an SCR (Silicon Controlled Rectifier) power switch 34, a commutating circuit 36 for the power switch, and a switch controller 38 which supplies gating signals to the power switch and commutating circuit to actuate the power switch to its conducting and blocking states alternately. In the ensuing description, the terms "ON" and "OFF" are used to designate the conducting and blocking states of the power switche as well as the other SCR switches referred to later. In both the drive and regenerative modes of the drive system, switching of the power switch 34 between its ON and OFF states effects energy transfer between the battery 10 and torquer 12 in repetitive energy transfer cycles. During each cycle, the power switch remains ON for a time $t_{ON}$ and OFF for a time $t_{OFF}$. The chopper circuit 20 has a duty cycle $\alpha$ which is defined as the ratio of the switch ON time ($t_{ON}$) to the total cycle time T ($t_{ON} + t_{OFF}$), i.e.

$$\alpha = t_{ON}/T$$

Energy transfer between the battery 10 and motor 12 is regulated by regulating this duty cycle.

Mode switching means 22 cooperates with the diodes 24, 26, 28, and 30 to establish the operating mode of the drive system. The mode switching means are operable to a drive condition or configuration to place the drive system in its drive mode and to a regenerative condition or configuration to place the drive system in its regenerative mode.

Manual control 32 commands or controls the duty cycle of the chopper circuit 20 and thereby energy transfer between the battery 10 and torquer 12 to command driving torque in the driving mode and braking torque in the regenerative mode of the drive system. The control also actuates the mode switching means 22 between drive and regeneration.

Figure 2:
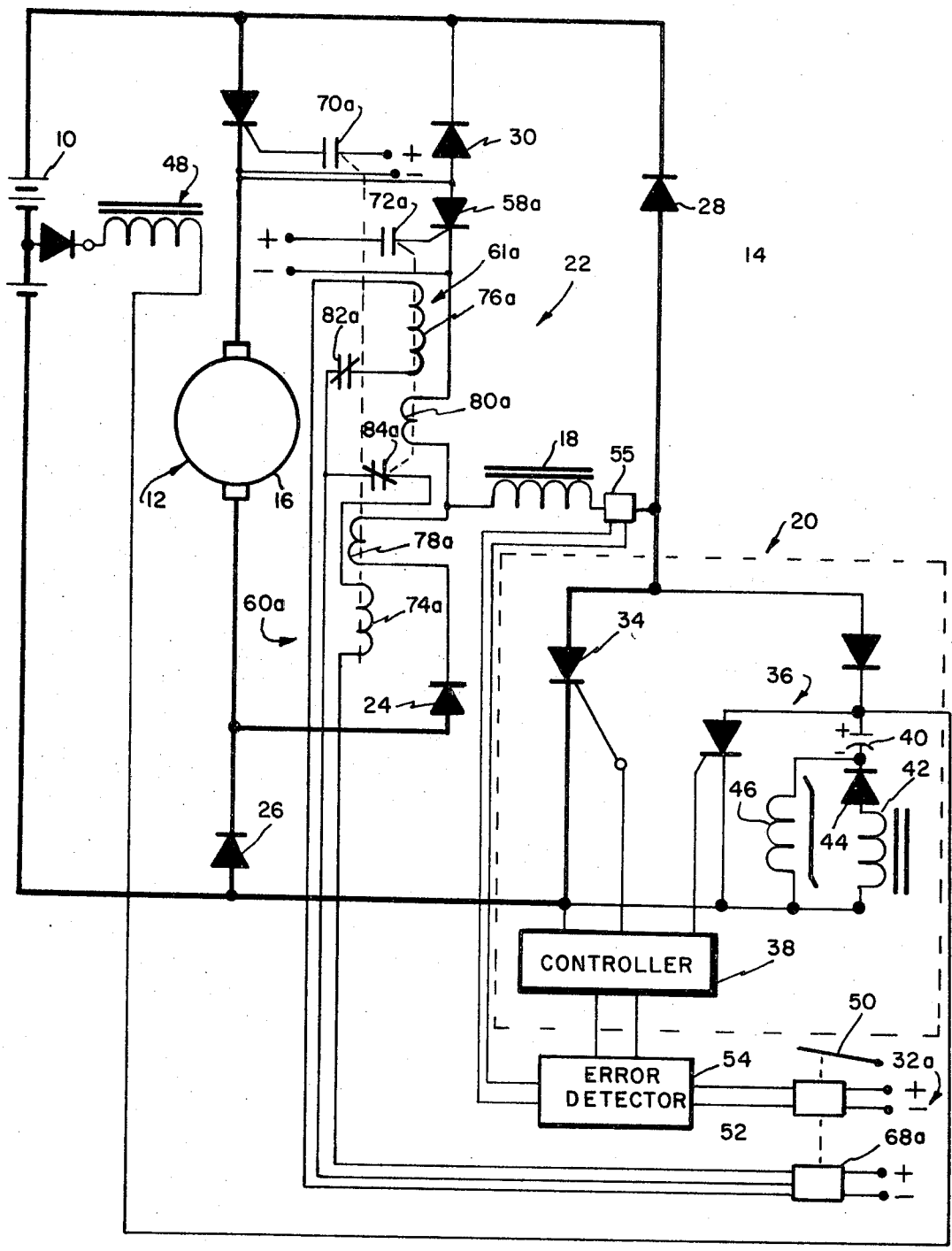
FIG. 2 schematically illustrates an all solid state battery powered regenerative drive system according to the invention.

As will appear from the ensuing description, the mode switching means 22 and diodes 24, 26, 28, and 30 have a unique arrangement which constitutes the subject matter of the present invention. This arrangement enables the mode switching function to be accomplished with a minimum number of relatively low cost, small size, light-weight circuit elements including only two active switches which need be rated only for voltage blocking and current conduction, not power handling and current interruption. These switches may be the contacts of one single pole double throw relay (FIG. 1) or solid state switching means such as silicon controlled rectifiers (FIG. 2). Accordingly, it will be understood that the term "switches" are used inthe present disclosure in the same sense as is customary in the electrical transmission art to denote voltage blocking and current conduction switching devices in contrast to power handling current interruption switching devices, such as switches or breakers.

Except for the improved mode switching means 22, the present drive system is similar to that disclosed in the earlier mentioned copending application. Briefly, in operation of the present drive system, the power switch 34 is actuated between its ON and OFF states with a duty cycle $\alpha$ commanded by the manual control 32. When the power switch is ON in the drive mode, the torquer 12 is powered by energy stored in the battery 10, and current flow occurs through the drive system in the directions indicated by the solid line arrows labeled C (conducting) to produce an electromagnetic driving torque on the torquer armature 16 and store electrical energy in the torquer field 18. When the power switch is OFF in the drive mode, the energy stored in the field discharges through the armature to produce current flow in the directions indicated by the solid line arrows labeled B (blocking). This current flow occurs through the armature in the same direction as when the power switch is ON to produce continued driving torque on the armature.

In the regenerative mode of the drive system, the torquer 12 is driven as a generator, such as during downhill coasting of a vehicle powered by the drive system, and the power switch 22 is again actuated between its ON and OFF states alternately. When the power switch is ON, the torquer produces current flow through the drive system in the directions indicated by the broken line arrows labeled C to store energy in the torquer field 18 and produce an electromagnetic braking torque on the armature 16. When the power switch is OFF, current flow occurs in the directions indicated by the broken line arrows labeled B to effect charging of the battery 10 by the combined output energy from the torquer and stored energy in the torquer field and produce a braking torque on the armature.

Referring now in more detail to the drive system of FIG. 1, the commutating circuit 36 includes a commutating SCR switch 39, a commutating capacitor 40, a linear inductor 42 with its directional rectifier 44, a saturating reactor 46, and a precharge circuit 48. In both the drive and regenerative modes of the drive system, the capacitor 40 is initially charged through the precharge circuit 48. When the commutating SCR 39 is turned ON by application of a low power signal to its gate from controller 38, with the power switch 34 in its ON state, capacitor 40 discharges through the linear inductor 42 while the saturating reactor 46 is blocking and resetting magnetically. The linear inductor 42 and capacitor 40 form a resonant circuit which oscillates at the resonant frequency of the circuit. During this oscillation, the power stored in capacitor 40 is transferred to the linear inductor 42 which, in turn, delivers the power to the capacitor in a reverse direction. This oscillation establishes the common node of the capacitor 40 and the saturating reactor 46 at a voltage approximately equal and opposite to the battery voltage. Thus, when the saturating reactor saturates, the power switch 34 and the commutating switch 39 are subjected to a reverse voltage across their terminals. This reverse voltage causes the switches to turn OFF and stop conducting. Capacitor 40 recharges via the saturated saturable reactor 46, after which the power switch 34 is gated ON by applying a gating signal to its gate from controller 38 and the above cycle is repeated. Thus, the power switch 34 may be gated ON and OFF in alternate sequence by applying gating signals alternately to the gates of switches 34, 39.

Manual control 32 comprises a throttle pedal 50 movable between a fully released or retracted maximum braking torque position and a fully depressed or extended maximum driving torque position through an intermediate mode transfer position. For convenience, the range of pedal positions between the fully retracted and mode transfer positions is referred to as the braking range. The range of pedal positions between the mode transfer and fully depressed positions is referred to as the driving range. Throttle pedal 50 operates a torque command signal source 52, such as a rheostat, which produces a torque command signal representing driving or braking torque, as the case may be, related to throttle pedal position. Thus, when the throttle pedal is depressed through its driving range from mode transfer position, the signal source 52 produces a torque command signal representing increasing driving torque. When the throttle pedal is released to retract through its braking range from mode transfer position, the signal source produces a torque command signal representing increasing braking torque.

In accordance with the invention disclosed in the aforementioned copending application, the torque command output of the torque command signal source 52 is fed to an error detector 54. Error detector 54 receives a second input from a current sensor 55 in series with the torquer field 18. This sensor produces an output proportional to the current flow through the field. The output of error detector 54 is a signal representing the difference between the sensor and torque command signals to the detector. This output signal is fed to the switch controller 38. Switch controller 38, which may be a pulse width modulator or comprise a clock pulser and variable time pulser like those disclosed in U.S. Pat. No. 3,566,717, has outputs connected to the gates of power switch 34 and commutating switch 39. The switch controller feeds to the power and commutating switches gating signals for gating the switches ON and OFF in such a way as to establish a duty cycle $\alpha$ related to the amplitude of the input signal to the controller. More specifically, the controller feeds to the power switch 34 a gating signal having periodic gating pulses which gate the power switch ON and for a period $t_{ON}$ proportional to the amplitude of the controller input signal. The controller feeds to the commutating switch 39 a gating signal having periodic gating pulses which occur between the gating pulses to the power switch and gate the commutating switch ON and thereby the power switch OFF for a period such that each power switch time, $t_{ON}$ pulse and the following power switch time OFF, $t_{OFF}$, pulse have a total or combined period T.

Except for the improved mode switching means 22, the drive system as described to this point is generally similar to that disclosed in the aforementioned copending application. This improved mode switching means, which constitutes the subject matter of the present invention, will now be described.

Mode switching means 22 comprises a pair of switches 56, 58 which, in the particular drive system shown in FIG. 1, are the normally open and normally closed contacts, respectively, of a selflatching single pole double throw mode control relay 60. Relay 60 has a voltage coil 62 and zero current dropout coils 64, 66. Relay coil 62 is connected to an energizing source through a switch 68 actuated by the throttle pedal 50. Switch 68 closes to energize the relay coil 62 upon depression of the throttle pedal through its mode transfer position toward its driving range and opens to deenergize the coil upon retraction of the pedal through its mode transfer position toward its braking range. The relay current coils 64, 66 sense current flow through the relay contacts 56, 58. Coil 66 actuates normally closed lockout contacts 69 in series with coil 62. In the ensuing description, the normal positions (illustrated) of the relay contacts 56, 58 are referred to as their regeneration positions. The positions occupied by the contacts when the relay coil 62 is energized (i.e., contacts 56 closed and contacts 58 open) are referred to as their drive positions. Relay current coil 64 is referred to as a drive current sensor and current coil 66 as a regeneration current sensor which opens contacts 69 in response to current flow through the sensor.

The operation of the drive system will now be described assuming the throttle pedal 50 to be initially in its fully released or retracted position with the vehicle stationary. Under these conditions the mode control relay contacts 56, 58 occupy their illustrated regeneration positions, lockout contacts 69 are closed, the torquer armature 16 is stationary, and no current flow occurs in the drive system.

Assume now that the throttle pedal is depressed through its mode transfer position to a final position in its driving range corresponding to a selected driving torque. As the pedal passes through its mode transfer position, it actuates the pedal switch 68 to shift the mode control relay contacts 56, 58 to their drive positions and feeds to the error detector a torque command signal which progressively increases to a level representing the selected driving torque commanded by the final pedal position. The error detector also receives from the current sensor 55 a signal proportional to the current flow through the torquer field 18 and hence to the actual driving torque developed by the torquer. The output from the error detector is proportional to the difference between the torque command and current sensor input signals to the detector. This output from the error detector activates the switch controller 38 which then feeds gating signals to the power switch 34 and commutating switch 39 for gating the power switch ON and OFF in the manner explained earlier.

Each time the power switch 34 gates ON with the mode control relay contacts 56 and 58 in drive position, current flow occurs in the directions of the solid line arrows C in FIG. 1. As shown, this current flow is from the battery 10, through the contacts 56, torquer armature 16, diode 24, drive current sensor 64, torquer field 18, and power switch 34, back to the battery. This current flow produces a driving torque on the torquer armature and stores electrical energy in the torquer field. Each time the power switch gates OFF, the stored energy in the torquer field 18 discharges to produce current flow through the drive system in the directions indicated by the solid line arrows B. This current flow occurs from the field, through the diode 28, which is a flyback diode, mode control relay contacts 56, torquer armature 16, diode 24, and drive current sensor 64, back to the field to produce a continued driving torque on the armature.

Accordingly, depression of the accelerator pedal 50 to a selected driving position results in substantially continuous current flow through the torquer 12 for accelerating a vehicle powered by the drive system with a driving torque corresponding to the final pedal position, as explained more fully in the earlier mentioned copending application. Release of the throttle pedal for return toward its mode transfer position causes a reduction in current flow through and driving torque developed by the torquer 12 to effect deceleration of the vehicle. regard, Assume now that the throttle pedal 50 is released for return through its mode transfer position to a selected position within its braking range. The torquer armature 16 is then driven in a generator mode from the road by the inertia of the vehicle and, in the case of downhill coasting of the vehicle, by the additional action of the gravitational force on the vehicle. As the throttle pedal passes through mode transfer position, the pedal switch 68 is actuated to deenergize the mode control relay coil 62. However, the relay contacts 56, 58 remain in their drive positions by virtue of the holding action of the relay drive current sensor 64 and until the current flow through this sensor drops to zero or some preset low level compatible with the rating of the relay. At this point, the relay contacts are released to return to their normal or regeneration positions of FIG. 1. In this regard, attention is directed to the earlier discussion wherein it was noted that the swtiches or contacts 56, 58 need be rated only for voltage blocking and current conduction and not for power handling and current interruption.

With the throttle pedal 50 held at a selected position in its braking range and the mode control relay contacts 56, 58 in their regeneration positions of FIG. 1, the power switch 34 is again gated ON and OFF with a duty cycle $\alpha$ related to the pedal position, as explained more fully in the copending application. Each time the power switch gates ON, current flow occurs through the drive system in the directions of the broken line arrows C in FIG. 1. This current flow occurs through the torquer armature 16, mode control relay regeneration contacts 58, the regeneration current sensor 66, torquer field 18, power switch 34, and diode 26 back to the armature to store energy in the field. Each time the power switch gates OFF, the power generated by driving of the torquer armature 16, as well as the energy stored in the torquer field 18, is delivered to the battery 10 to charge the battery. In this OFF state of the power switch, current flow occurs in the directions of the broken line arrows B through the armature 16, relay regeneration contacts 58, regeneration current sensor 66, torquer field 18, flyback diode 28 back to the battery. Operation of the torquer 12 in this generator mode produces an electromagnetic braking torque on the torquer armature corresponding to the braking position of the throttle pedal, as explained more fully in the copending application. The current flow through sensor 66 retains the lockout contacts 69 open.

If the throttle pedal is again depressed through its mode transfer position to a selected position in its driving range, the mode control relay 60 is again actuated to its drive condition to effect driving of the torquer armature 16 by the battery 10 in the manner explained earlier. During this mode transfer, however, the relay contacts 56, 58 initially remain in their regenerative positions owning to current flow through the regeneration current sensor 66 which retains the lockout contacts open to prevent energizing of the relay coil 62. When the current flow through the sensor 66 decays to zero or a low level, the lockout contacts 69 reclose, to energize relay coil 62 and the relay contacts 56, 58 shift to their drive positions. Diode 30 provides a voltage regulating action for protecting the torquer 12 against generating voltages higher than battery voltage and thereby causing improper operation.

The solid state drive system of FIG. 2 is identical to the single relay system of FIG. 1 except for replacement of the mode control relay 60 by solid state switches 56a, 58a, such as thyristors, and a pair of self-latching single pole double throw relays 60a, 61a, and replacement of the throttle pedal switch 68 by a single pole double throw switch 68a for controlling the relays. The gate terminals of switch 56a are connected to a gating voltage source through normally open contacts 70a of relay 60a. The gate terminals of switch 58a are connected to a gating voltage source through normally open contacts 72a of relay 61a. Relays 60a, 61a have voltage coils 74a, 76a connected to an energizing source through the pedal switch 68a and zero current dropout coils 78a, 80a connected to the drive system circuit in the same manner as the current coils of the mode control relay in FIG. 1. Coils 78a, 80a actuate normally closed interlock contacts 82a, 84a in series with the relay voltage coils 76a, 74a, respectively. For convenience, relays 60a, 61a are shown separately from the switch controller 68. In actual practice, however, the relays may be embodied in the controller.

In the following description, switches 56a, 58a; relay contacts 70a, 72a; relay voltage coils 74a, 76a; and relay current coils 78a, 80a are referred to as drive and regeneration switches, drive and regeneration contacts, drive and regeneration coils, and drive and regeneration current sensors, respectively.

The solid state drive system operates in the same manner as the single relay drive system of FIG. 1 except for the manner in which the solid state drive system is switched between its drive and regenerative modes. Thus, in the solid state drive system, when the throttle pedal 50 is in its braking range, the pedal switch 68a is positioned to energize regeneration relay coil 76a and close its contacts 72a for applying a gating voltage to the regeneration switch 58a and thereby placing the latter switch in its conducting state. Current flow then occurs through the drive system in the same directions as indicated by the broken line arrows B, C in FIG. 1 to charge the battery 10 and produce braking torque on the torquer armature 16. This current flow occurs through regeneration current sensor 80a to open interlock contacts 84a and prevent energizing of drive relay coil 74a. When the throttle pedal is in its driving range, the pedal switch is positioned to energize relay drive coil 74a and close relay drive contacts 70a for applying a gating voltage to the drive switch 56a and thereby placing the latter switch in its conducting state. Current flow then occurs through the drive system in the same directions as indicated by the solid line arrows B, C in FIG. 1. This current flow occurs through drive current sensor 78a to open interlock contacts and prevent energizing of regeneration relay coil 76a.

During operation of the drive system, when the throttle pedal is depressed through its mode transfer position from its braking range into its driving range to accelerate, the relay regeneration coil 76a is deenergized and the relay drive coil 74a is energized to open the relay regeneration contacts 72a and close the drive relay contacts 70a. However, these relay contacts do not immediately open and close owing to current flow through the regeneration current sensor 80a which holds the relay contacts 72a closed and prevents energizing of the drive relay coil until the current flow through the sensor decays to zero. At this point, regeneration contacts 72a and interlock contacts 84a are released to open and close, respectively, drive relay coil 74a is energized to close its drive contacts 70a and open its interlock contacts 82a, regeneration switch 58a turns OFF, and a gating voltage is applied to the drive switch 56a for turning this switch ON. A reverse action occurs when the throttle pedal is released to retract through its mode transfer position into its braking range to decelerate. In this case, the relay drive contacts 70a remain closed and interlock contacts 82a remain open until current flow through the drive current 78a decays to zero. The drive contacts 70a and interlock contacts 82a then open and close, respectively, drive switch 56a turns OFF, and the regeneration relay coil 76a reenergizes to open its interlock contacts 84a and close its contacts 72a for turning ON the regeneration switch 58a.

What is claimed as new in support of Letters Patent is:

1. A battery powered regenerative drive system operable in a drive mode and a regenerative mode, comprising:
   a battery;
   a direct current torquer having an armature and a field and operable as a motor in said drive mode and a generator in said regenerative mode;
   a power control circuit connecting said battery and torquer for transmitting energy from said battery to said torquer to produce an electromagnetic driving torque on said armature in said drive mode, and transmitting energy from said torquer to said battery to charge said battery and produce an electromagnetic braking torque on said armature in said regenerative mode; and
   said control circuit including first, second and third circuit legs connected in electrical parallel and having first electrically connected ends and second electrically connected ends, and a fourth circuit legs terminally connected to said second leg at first and second junctions adjacent said first and second leg ends, respectively, and a fifth circuit leg terminally connected to said third and fourth legs between the ends thereof, said battery being serially connected in said first leg with its positive and negative terminals adjacent said first and second leg ends, respectively, said armature being serially connected in said second leg between its first and second junctions with said fourth leg, said field being serially connected in said fifth leg, a drive mode switch serially connected in said second leg between its first end and its first junction with said fourth leg, a diode serially connected in said second leg between its second end and its second junction with said fourth leg for conducting current toward said second junction, a diode serially connected in said third leg between its first end and its junction with said fifth leg for conducting current toward the latter leg end, a power switch serially connected in said third leg between its second end and its junction with said fifth leg, a regenerative mode switch serially connected in said fourth leg between its first junction with said second leg and its junction with said fifth leg, a diode serially connected in said fourth leg between its second junction with said second leg and its junction with said fifth leg for conducting current toward said latter junction, means for actuating said regenerative and drive mode switches to conducting and blocking states, respectively, to condition said drive system for operation in the regenerative mode, and to blocking and conducting states, respectively, to condition said drive system for operation in the drive mode, and means for periodically actuating said power switch between blocking and conducting states alternately for a variable time period.

said mode switches are contacts of a mode control relay means.

3. A drive system according to claim 2 wherein:
   said relay means comprises one single pole double throw relay.

4. A drive system according to claim 1 wherein:
   said mode switches are solid state swtiches.

5. A drive system according to claim 4 wherein:
   said solid state switches are silicon controlled rectifiers.

6. A drive system according to claim 1 wherein:
   said switch actuating means comprise a manual control such as a throttle pedal movable between braking and driving positions through an intermediate mode transfer position, means actuated by said manual control for placing said mode switches in their regenerative mode states in response to movement of the manual control through mode transfer position into the braking range and in their drive mode states in response to movement of the manual control through mode transfer position into the driving range, and a time ratio controlled circuit controlled by said manual control for regulating the duty cycle of said power switch in response to movement of said manual control through said ranges.

* * * * *